Patented Oct. 25, 1932

1,884,024

UNITED STATES PATENT OFFICE

MARTIN LUTHER, OF MANNHEIM, AND ROBERT HELD, OF OPPAU, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

PRODUCTION OF PLASTIC MASSES

No Drawing. Original application filed June 3, 1929, Serial No. 368,185, and in Germany June 16, 1928. Divided and this application filed July 19, 1930. Serial No. 469,250.

The present invention relates to the production of plastic masses.

It is already known that by the destructive oxidation of paraffin hydrocarbons, waxes and the like, for example by passing a strong current of air through the initial material in the liquid state preferably while heating and in the presence of fillers possessing a large superficial area, a mixture of organic products containing oxygen is obtained, which consists mainly of neutral oxygen compounds, saturated fatty acids and dark colored acid products, insoluble in petroleum ether. The acids which are insoluble in petroleum ether may be separated from the saturated fatty acids for example by pressing or sweating or a combination of both these processes.

We have now found that valuable plastic products are obtained by heating that liquid part of the acids obtained by the oxidation of paraffin hydrocarbons, which is insoluble in petroleum ether with organic compounds which contain two or more hydroxyl groups in the molecule to a temperature above about 150° C., if desired with the addition of other substances. Usually heating to a temperature between 150° and 220° C. is sufficient and the reaction proceeds in most cases quickly enough for technical purposes when heating to about 190° C. The quantity employed of the hydroxyl bearing organic compounds should correspond to about one half of that corresponding to the saponification value acid component, but a higher quantity may also be employed. According to the method of production these plastic products possess the properties of linoxyn or rubber oil substitute and are well adapted for employment for example in the manufacture of linoleum or for filling or improving rubber products, lacquers, artificial masses and the like. The following may be mentioned among others as suitable organic compounds containing hydroxyl groups:—glycols, ethers of glycols with the same or other glycols, glycerol, mannitol, sorbitol, glucose and the like.

The treatment may be carried out in any known and suitable apparatus if desired in the presence of catalysts splitting off water, and/or with admixture with other substances and at normal, increased or reduced pressures, suitable substances to be added are for example metal compounds, as for example lead oxide and the like, which with the said acids give agents of siccative action, or also a sulphurizing substance such as sulphur or compounds containing sulphur and the like. The said acids may also be heated in admixture with unsaturated acids for example linoleic acid or with hydroxy carboxylic acids, such as ricinoleic acid, which are equivalents to the unsaturated acids inasmuch as they are capable of forming unsaturated acids by splitting off water or glycerides of the said acids. The process in accordance with the present invention may also be advantageously carried out by treating the acids or mixtures of acids with siccatives, i. e. compounds of the heavy metals, such as compounds of lead, manganese or cobalt or several of such compounds, or with sulphur previously to the esterification. In the treatment it is not necessary to employ the stoichiometrical quantity of hydroxyl compounds corresponding to an esterification of the organic acids present, but valuable plastic products are obtained by employing considerably smaller quantities, for example half of the theoretically calculated quantity. It is advantageous to carry out the heat treatment at an elevated temperature in the liquid phase while passing through a gas or vapour such as nitrogen or carbon dioxide.

The following examples will further illustrate the nature of the invention but the invention is not restricted to these examples. The parts are by weight.

Example 1

150 parts of the dark colored and liquid acid constituent of an oxidation product from paraffin hydrocarbons, obtainable by pressing the crude oxidation product, which is insoluble in petroleum ether and has a saponification value of 235, are heated together with 19.3 parts of glycerol at from 170° to 210° centigrade in vacuo while stirring for an hour. After a further half an hour the mixture becomes viscous and finally solid. The reaction product is a dark, tenacious, nongreasy, very elastic mass which is insoluble in alcohol, petroleum ether and acetone, soluble with difficulty in higher alcohols and ethers, and soluble in benzene, pyridine, trichlorethylene, and hot glacial acetic acid. It can be saponified with lyes.

*Example 2*

The substances described in Example 1 are mixed together in the same quantities with an addition of 10 per cent of sulphur calculated with reference to the weight of acid employed. After heating this mixture at from 150° to 170° centigrade for 4 hours in vacuo while stirring, a deep black, crumbly mass which in other properties is similar to that described in Example 1 is obtained.

*Example 3*

150 parts of liquid acid product insoluble in petroleum ether and having a saponification value of 258, obtained from an oxidation product of paraffin wax, are heated together with 2 per cent of lead oxide in vacuo at 160° centigrade while stirring for 2 hours, and then after adding the calculated quantity of glycerol heated for a further 2½ hours at from 200° to 210° centigrade. A product having similar properties to those described in Example 1, but which has greater density and tenacity, is obtained.

*Example 4*

The substances described in Example 1 are mixed in the quantities there given with an addition of 20 parts of linseed oil. After heating for 3 hours at from 210° to 240° centigrade a dark mass having similar properties to the product in Example 1, but being a little more tenacious, is obtained.

*Example 5*

150 parts of the liquid acid product having a saponification value of 258 described in Example 3 are heated together with 10.5 parts of glycerol for 2½ hours in vacuo at from 170 to 200° centigrade while stirring. A product having similar properties to that described in Example 1, but having greater tenacity, is obtained.

The present application has been divided out from our copending application Ser. No. 368,185, filed June 3, 1929.

What we claim is:

1. The process for the production of plastic masses which comprises heating the liquid acid portion, insoluble in petroleum ether, of a product of the destructive oxidation of paraffin hydrocarbons, with a polyhydric alcohol to a temperature above about 150° centigrade in the presence of a sulphur-bearing vulcanizing agent.

2. The process for the production of plastic masses which comprises heating the liquid acid portion, insoluble in petroleum ether, of a product of the destructive oxidation of paraffin hydrocarbons, with an unsaturated organic acid and a polyhydric alcohol to a temperature above about 150° centigrade in the presence of a sulphur-bearing vulcanizing agent.

3. Plastic tenacious masses comprising a heat reaction and sulphur-bearing vulcanization product of a mixture comprising esters of the acid constituents of the liquid acid portion, insoluble in petroleum ether, of a product of the destructive oxidation of paraffin hydrocarbons, with a polyhydric alcohol.

4. Plastic tenacious masses comprising a heat reaction and sulphur-bearing vulcanization product of a mixture comprising esters of the acid constituents of the liquid acid portion, insoluble in petroleum ether, of a product of the destructive oxidation of paraffin wax, with a polyhydric alcohol.

5. Plastic tenacious masses comprising a heat reaction and sulphur-bearing vulcanization product of a mixture comprising esters of the acid constituents of the liquid acid portion, insoluble in petroleum ether, of a product of the destructive oxidation of paraffin wax, with glycerol.

6. The process for the production of plastic masses which comprises heating at a temperature ranging from about 150° to about 240° C. the liquid acid portion, insoluble in petroleum ether, of a product of the destructive oxidation of paraffin hydrocarbons, with an aliphatic compound containing at least two hydroxyl groups in its molecule, in the presence of a sulphur-bearing vulcanizing agent.

7. The process for the production of plastic masses which comprises heating at a temperature ranging from about 150° to about 240° C. the liquid acid portion, insoluble in petroleum ether, of a product of the destructive oxidation of paraffin wax, with an aliphatic compound containing at least two hydroxyl groups in its molecule, in the presence of a sulphur-bearing vulcanizing agent.

8. The process for the production of plastic masses which comprises heating at a temperature ranging from about 150° to about 240° C. the liquid acid portion, insoluble in petroleum ether, having a saponification value ranging from about 235 to about 258, of a product of the destructive oxidation of paraffin hydrocarbons, with an aliphatic compound containing at least two hydroxyl groups in its molecule, in the presence of a sulphur-bearing vulcanizing agent.

9. The process for the production of plastic masses which comprises heating at a temperature ranging from about 150° to about 240° C. the liquid acid portion, insoluble in petroleum ether, having a saponification value ranging from about 235 to about 258, of a product of the destructive oxidation of paraffin wax with an aliphatic compound containing at least two hydroxyl groups in its molecule, in the presence of a sulphur-bearing vulcanizing agent.

10. The process for the production of plastic masses which comprises heating at a temperature ranging from about 150° to about 240° C. the liquid acid portion, insoluble in petroleum ether, of a product of the destructive oxidation of paraffin hydrocarbons, with glycerol in the presence of a sulphur-bearing vulcanizing agent.

11. The process for the production of plastic masses which comprises heating at a temperature ranging from about 150° to about 240° C. the liquid acid portion, insoluble in petroleum ether, having a saponification value ranging from about 235 to about 258, of a product of the destructive oxidation of paraffin wax with glycerol in the presence of a sulphur-bearing vulcanizing agent.

12. The process for the production of plastic masses which comprises heating at a temperature ranging from about 150° to 240° C. the liquid acid portion, insoluble in petroleum ether, having a saponification value ranging from about 235 to about 258, of a product of the destructive oxidation of paraffin wax with glycerol in the presence of sulphur.

13. Plastic, tenacious masses comprising a heat reaction and sulphur-bearing vulcanization product of the liquid acid portion, insoluble in petroleum ether, of a product of the destructive oxidation of paraffin hydrocarbons, having a saponification value ranging from about 235 to about 258, with glycerol.

14. Plastic, tenacious masses comprising a heat reaction and sulphur-bearing vulcanization product of the liquid acid portion, insoluble in petroleum ether, of a product of the destructive oxidation of paraffin wax, having a saponification value ranging from about 235 to about 258, with glycerol.

In testimony whereof we affix our signatures.

MARTIN LUTHER.
ROBERT HELD.